Oct. 12, 1926.

J. HACKENBERG 1,602,662

MEANS FOR DRIVING DYNAMOS FROM VEHICLE WHEEL AXLES

Filed March 5, 1926

Inventor
Johann Hackenberg
By Cushman Bryant Darby
attys

Patented Oct. 12, 1926.

1,602,662

UNITED STATES PATENT OFFICE.

JOHANN HACKENBERG, OF BERLIN, GERMANY.

MEANS FOR DRIVING DYNAMOS FROM VEHICLE WHEEL AXLES.

Application filed March 5, 1926, Serial No. 92,606, and in Germany August 27, 1925.

This invention relates to means for driving dynamos from vehicle wheel axles, for example to generate current for lighting.

Where the dynamo shaft is co-axially coupled with or forms part of the axle, the relatively low speed of revolution thereby obtainable entails the use of a dynamo of considerable weight, which exerts a detrimental stress on the axle box. In other known arrangements wherein a dynamo is carried on the axle box and the dynamo shaft is located at an angle to the axle, the eccentric disposition of the weight of the dynamo necessitates the employment of counterweights and also causes undesirable loading or stressing of the axle box.

An object of the present invention is to overcome these drawbacks.

According to this invention the dynamo is rigidly connected with the axle box in such manner that its vertical symmetrical plane coincides with the vertical symmetrical plane of the axle box, and the drive is effected through a pair of gear wheels in direct engagement, one of the said gear wheels being secured on the end of the axle co-axially therewith, and the other of said gear wheels being on the end of the dynamo shaft.

In order that the said invention may be clearly understood and readily carried into effect, the same will be described more fully with reference to the accompanying drawings in which:—

In the axle box $a$ the reduced end $b$ of of the axle turns on roller bearings $c\ c$. The casing $d$ of the dynamo is rigidly connected with the box $a$.

Figure 1:
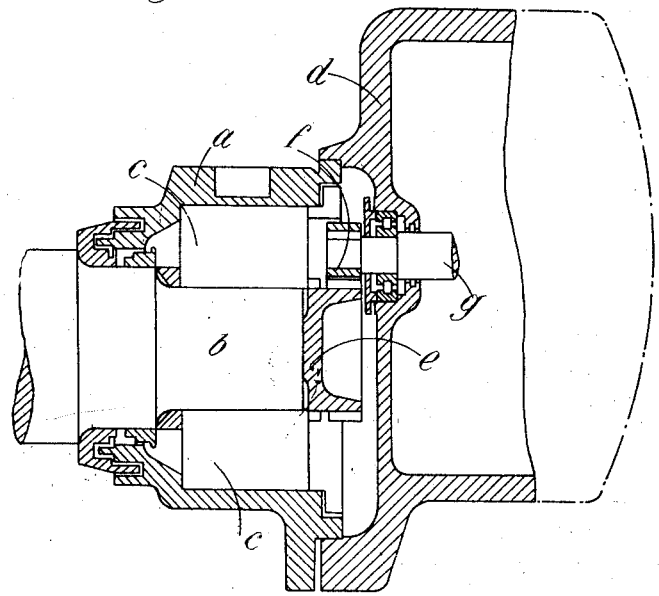
Figure 1 illustrates in elevation, partly in central vertical section, one embodiment of the invention.

On the end of the axle is secured an externally toothed gear wheel $e$ (Figure 1) in mesh with a smaller gear wheel $f$ secured on the armature shaft $g$ of the dynamo. By suitably dimensioning the gear wheels $e\ f$ the speed of rotation of the shaft $g$ can be substantially increased in relation to the speed of rotation of the axle $b$, so that the weight of the dynamo can be kept small.

Figure 2:
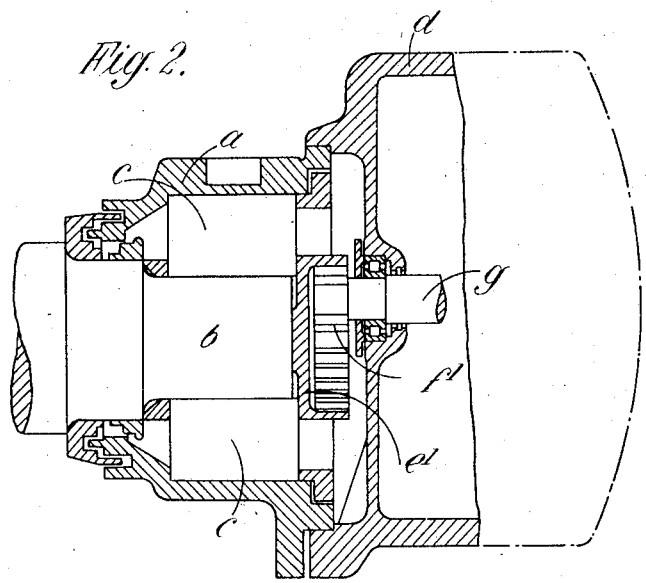
Figure 2 is a similar view illustrating another embodiment of the invention.

In the constructional form represented in Figure 2, the gear wheel $e'$ on the axle is provided with internal teeth, and the gear wheel $f'$ rotates inside the said wheel $e'$. This construction is still more advantageous in that the axis of the armature shaft $g$ can be brought nearer to the axis of the axle, consequently the top of the dynamo casing $d$ only rises slightly above the top of the axle box $a$, and is out of the way of any constructional parts of the vehicle situated above the dynamo.

What I claim and desire to secure by Letters Patent of the United States is:—

1. In combination, a vehicle axle and axle box a dynamo, a dynamo casing rigidly secured to said box, the shaft of said dynamo being positioned in a plane coinciding with the central vertical symmetrical plane of the axle box, a gear wheel secured on the end of the axle co-axial therewith, and another gear wheel on the end of said dynamo shaft meshing directly with the first named gear wheel.

2. In combination, a vehicle axle and axle box, a dynamo, a dynamo casing rigidly secured to said box, the shaft of said dynamo being positioned in a plane coinciding with the central vertical symmetrical plane of the axle box, an internally toothed gear wheel secured on the end of the axle co-axially therewith, and another gear wheel on the end of said dynamo shaft meshing directly with the first named gear wheel.

JOHANN HACKENBERG.